United States Patent [19]
Gee

[11] Patent Number: 5,718,316
[45] Date of Patent: Feb. 17, 1998

[54] ELECTRONICALLY CONTROLLED CLUTCH PEDAL DASHPOT DRIVELINE TORQUE

[75] Inventor: Thomas A. Gee, Allen Park, Mich.

[73] Assignee: Eaton Corporation, Cleveland, Ohio

[21] Appl. No.: 420,110

[22] Filed: Apr. 11, 1995

Related U.S. Application Data

[63] Continuation-in-part of Ser. No. 027,065, Mar. 4, 1993, Pat. No. 5,404,982.

[51] Int. Cl.$^6$ ............................................ B60K 23/02
[52] U.S. Cl. ..................... 192/109 F; 92/85 B; 92/143; 192/109 D
[58] Field of Search ................... 192/109 D, 109 F; 92/85 B, 143; 60/533; 477/175, 180, 181

[56] References Cited

U.S. PATENT DOCUMENTS

| | | | |
|---|---|---|---|
| 1,165,230 | 12/1915 | Degen | 192/109 D |
| 1,176,244 | 3/1916 | Redlich | 192/109 D X |
| 1,374,413 | 4/1921 | Webb | 192/109 D X |
| 1,435,732 | 11/1922 | Pierce | 192/109 D |
| 1,692,390 | 11/1928 | Smith | 192/109 D X |
| 1,764,752 | 6/1930 | Rodger | 192/109 D |
| 1,996,256 | 4/1935 | Price et al. | 92/85 X |
| 3,866,727 | 2/1975 | Myers | 92/143 X |
| 3,921,773 | 11/1975 | Dietrich | 192/109 D X |
| 3,963,107 | 6/1976 | Bolger | 192/109 D |
| 4,617,885 | 10/1986 | Oshira et al. | 123/192 B |
| 4,632,014 | 12/1986 | Endo | 91/369 A |
| 4,668,207 | 5/1987 | Koshimo | 464/63 |
| 4,693,354 | 9/1987 | Umeyama et al. | 192/70.17 X |
| 4,779,713 | 10/1988 | Tomala et al. | 192/88 A |
| 4,926,994 | 5/1990 | Koshizawa et al. | 192/11 OR |
| 4,947,972 | 8/1990 | Lea | 464/48 X |
| 5,009,299 | 4/1991 | Seegers | 192/85 C |
| 5,009,301 | 4/1991 | Spitler | 464/64 X |
| 5,127,506 | 7/1992 | Muller et al. | 192/85 C |
| 5,404,982 | 4/1995 | Gee | 192/109 D |

FOREIGN PATENT DOCUMENTS

| | | | |
|---|---|---|---|
| 52-75731 | 6/1977 | Japan | 192/109 F |
| 4-307125 | 10/1992 | Japan | 192/109 D |

OTHER PUBLICATIONS

Research Disclosure, disclosed anonymously, p. 371 May. 1990.

English translation of Reference "N" (52–75,731 —Ono —Japan).

*Primary Examiner*—Rodney H. Bonck
*Attorney, Agent, or Firm*—Brooks & Kushman P.C.

[57] ABSTRACT

An electronically controlled clutch pedal dashpot driveline torque limiter utilizes a solenoid to regulate the apply rate of a vehicle master clutch based on current vehicle operating conditions such as engine speed, transmission input speed, and clutch pedal release rate. The present invention allows greater control authority of master clutch apply rates to reduce or eliminate the incidence of engine stall and excessive slipping of the master clutch.

7 Claims, 4 Drawing Sheets

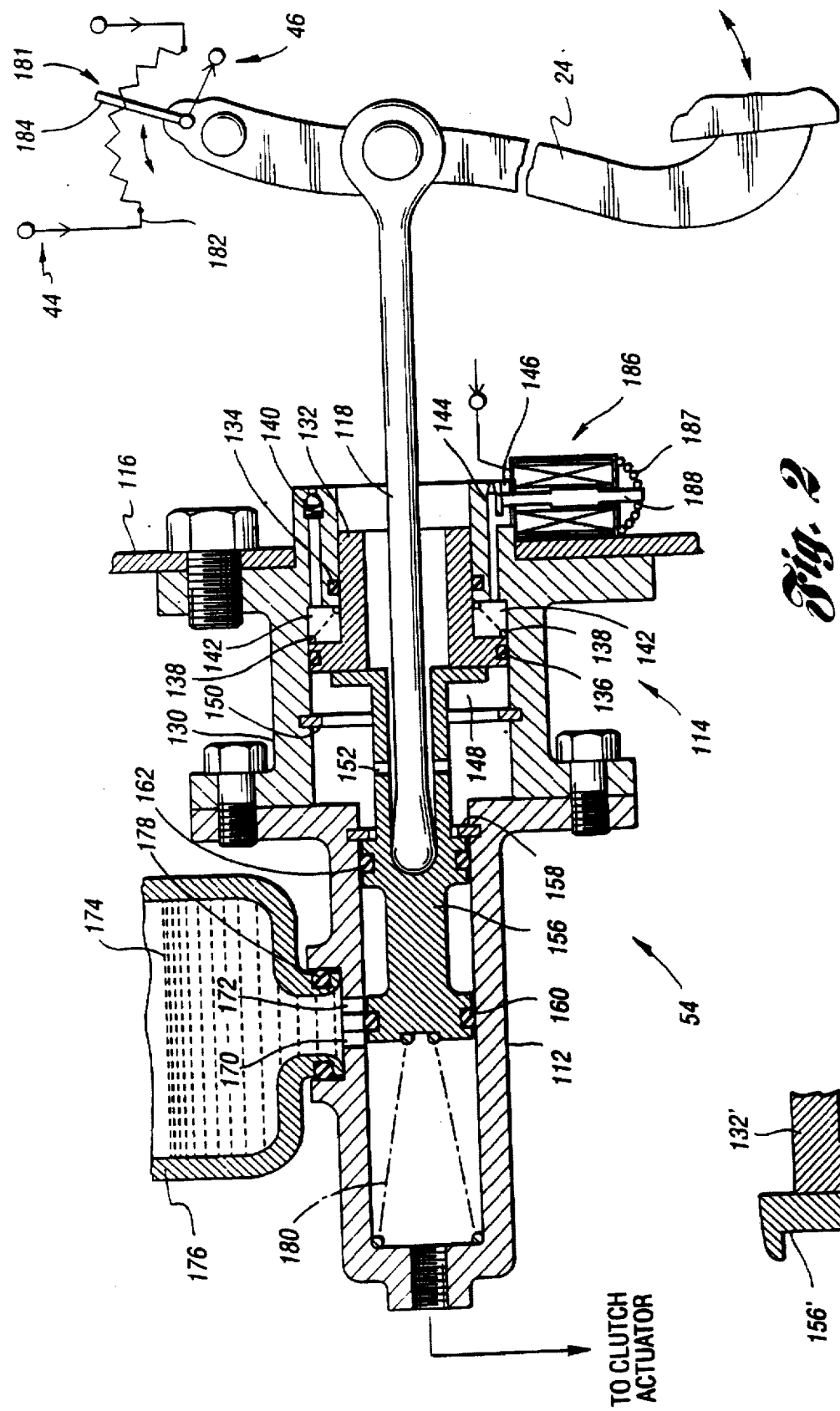
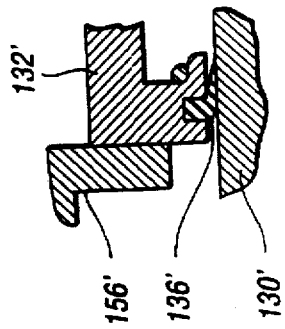
Fig. 2
Fig. 3

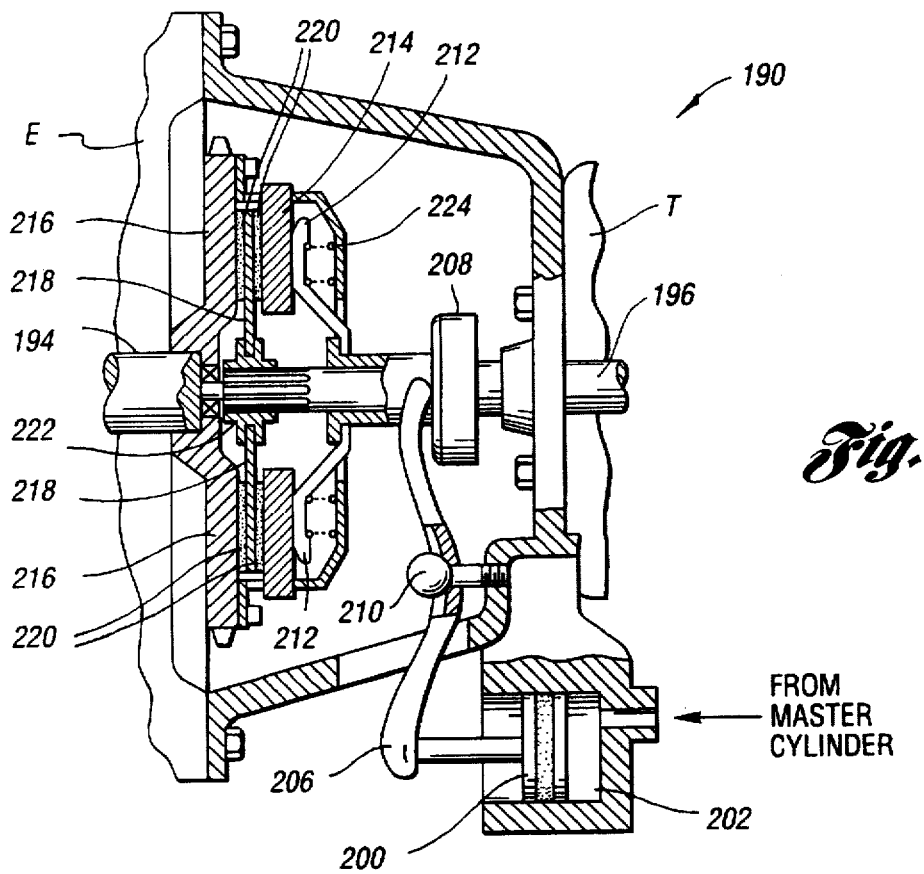
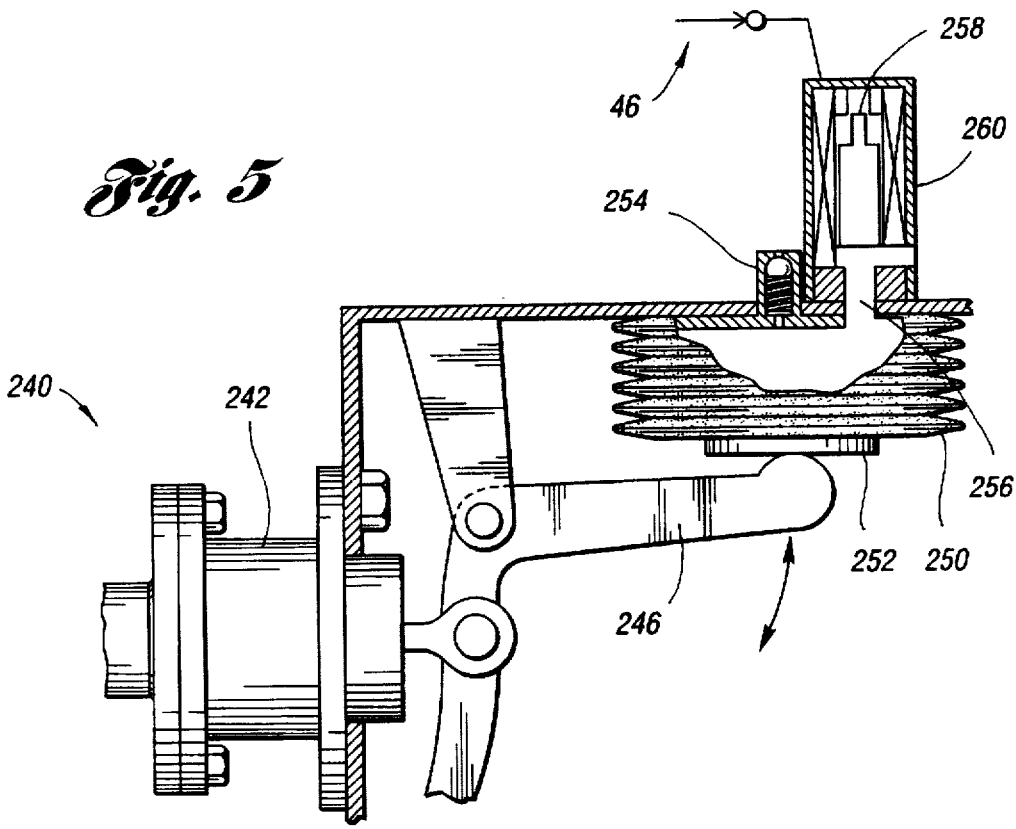

ELECTRONICALLY CONTROLLED CLUTCH PEDAL DASHPOT DRIVELINE TORQUE

CROSS-REFERENCE TO RELATED APPLICATION

This application is a continuation-in-part of U.S. patent application Ser. No. 08/027,065 filed Mar. 4, 1993, now U.S. Pat. No. 5,404,982, entitled "Clutch Pedal Dashpot Driveline Torque Limiter, the disclosure of which is hereby incorporated by reference in its entirety.

TECHNICAL FIELD

The present invention relates to vehicular master clutches and, more particularly, to electronically controlled clutch dampers for limiting the application of torque to truck driveline components.

BACKGROUND ART

Driveline component manufacturers, especially in the trucking industry, are continually being urged to improve the durability and reliability of driveline components, such as driveshafts, axles and gears. Since the best solution is not always merely one of "beefing up" the individual components, various damping devices have been conceived and are well-known in the art. Clutch damping/torque limiting devices are illustrated in U.S. Pat. Nos. 4,668,207, 4,693,354, 4,888,539, 4,947,972 and 5,009,301.

One problem of particular significance results when a vehicle operator overzealously engages the clutch by, for example, "side-stepping" the clutch. When a driver side-steps, the clutch pedal is depressed and a particular gear is selected. The engine is then revved up and the driver slides his foot sideways off of the clutch pedal, allowing the clutch pedal to snap back to the resting position. This results in a very rapid clutch engagement and application of torque to the driveline, inducing vibrations and oscillations into the driveline. The driveline components are seriously stressed and failure is hastened if the rate of torque application is faster than the natural frequency of the driveline. Specifically, unnecessary stress occurs when the driveline torque input has major harmonic content at frequencies at or above the lowest natural frequency of the driveline. Thus, if the rate of torque application is at or below the natural frequency, the driveline is not shocked.

It is therefore desirable to prevent overzealous engagement of a clutch by controlling the rate of torque applied to the driveline in a reliable, durable and cost-effective way.

In many applications, vehicles include electronically controlled powertrains, including an electronically controlled engine, transmission, and other auxiliary equipment, such as ABS, and the like. The use of electronic control modules (ECM's) provides coordinated control of various vehicle systems and subsystems to enhance overall vehicle control flexibility and capability. Electronically controlled systems typically provide more refined and accurate control than corresponding mechanical control systems. As more and more vehicles incorporate electronically controlled systems and subsystems, an increasing number of vehicle functions may be partially or fully automated and controlled by the ECM, such as shifting of the transmission. However, the initial cost and decreased fuel economy typical of a fully automated transmission result in continued demand for manually operated transmissions in some applications. For those applications requiring manipulation of a master clutch, it is desirable to electronically control the engagement rate of the master clutch to achieve the benefits of a mechanical clutch dashpot while providing more refined, context-sensitive control.

The influx of partially or fully automatic transmissions has resulted in a number of drivers who are unfamiliar with operation of a conventional master clutch. Those who occasionally rent vehicles having a transmission requiring proper manipulation of the master clutch to operate, often cause significant wear on various driveline components due to their inexperience. A rapid clutch engagement may result in a shock to the driveline as explained above, or may stall the engine. Similarly, an excessively slow clutch engagement results in undesirable clutch slip and premature failure of the clutch friction material. Thus, it is desirable to provide a low-cost system and method for use with these applications to reduce unnecessary component wear and improve the driveability of the vehicle.

DISCLOSURE OF THE INVENTION

It is an object of the present invention to provide a system and method for preventing overzealous engagement of a clutch by controlling the rate of torque applied to the driveline.

It is a further object of the present invention to provide an electronically controlled clutch pedal dashpot driveline torque limiter for preventing overzealous engagement of a clutch by controlling the rate of torque applied to the driveline.

Another object of the present invention is to provide a relatively low-cost system which capitalizes on the availability of an ECU to provide context-sensitive limit control of driveline torque.

A further object of the present invention is to provide a system and method for limiting application of driveline torque which are capable of reducing excessive clutch slip and the incidence of engine stall due to an inappropriate clutch engagement rate for the current operating conditions.

In carrying out the above objects, and other objects and features of the present invention, there is provided an electronically controlled clutch pedal dashpot for controlling the rate torque is applied to a vehicular driveline during coupling of an engine to the driveline. The clutch pedal dashpot is for use in a vehicle including an electronic control unit, a remote clutch pedal, and a clutch actuating mechanism for controlling torque coupling of the engine to the driveline, wherein the clutch pedal is displaced between a first position at which the clutch is engaged and a second position at which the clutch is disengaged. A pedal operated hydraulic master cylinder coupled to a slave cylinder is one example of this type of actuator.

In one embodiment, the clutch pedal dashpot comprises a damper having at least one passage controlled by a solenoid to regulate the rate at which the clutch pedal returns to the first position from the second position during coupling so as to control the rate of clutch engagement and therefore the rate of torque applied to the driveline.

In a preferred construction, the damper also includes a damper piston and the clutch pedal dashpot further comprises a damper piston stop member for limiting travel of the damper piston to only a portion of the possible travel during displacement of the clutch pedal from the first position to the second position. The clutch pedal dashpot also preferably comprises bias means for biasing the damper piston against the stop member during displacement of the clutch pedal from the first position to the second position.

Also preferably, the damper piston sealingly cooperates with a damper piston housing to create a chamber, and the piston housing includes a check valve for allowing air to be drawn into the chamber as the pedal is displaced from the first position to the second position and for preventing or impeding air from being expelled from the chamber as the pedal is displaced from the second position to the first position. The piston housing preferably includes at least one passage controlled by a solenoid in communication with the electronic control unit for regulating the flow of air into the chamber as the pedal is displaced from the first position to the second position and expelled from the chamber as the pedal is displaced from the second position to the first position.

A method for controlling the rate of torque application to the driveline during coupling is also provided. The method includes determining current operating conditions such as engine speed, transmission input speed, vehicle speed, transmission gear state, and attempted clutch engagement rate, and controlling the actual engagement rate based on at least one of the factors indicative of the current operating conditions.

The advantages accruing to the present invention are numerous. For example, the present invention utilizes electronic control to limit the rate that engine torque is applied to a driveline even when the vehicle operator tries to overzealously engage the clutch. As a result, driveline components can be designed to withstand smaller torques and fewer driveline components will fail, resulting in a substantial cost savings. Electronic control also provides the capability to determine an appropriate clutch engagement rate for the current operating conditions, such as transmission gear ratio, engine speed, vehicle speed, and the like. Thus, excessive clutch slip and the incidence of engine stall can be reduced or eliminated.

The above objects and other objects, features and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 2 is a cross-section of a first embodiment of an electronically controlled clutch pedal dashpot driveline torque limiter according to the present invention;

FIG. 3 is a cut-away of the clutch pedal dashpot shown in FIG. 2, illustrating the use of a lip seal instead of an O-ring;

FIG. 4 is a cross-section of a clutch mechanism for use with the electronically controlled clutch pedal dashpot driveline torque limiter of the present invention shown in FIG. 2;

FIG. 5 is a cross-section of a second embodiment of an electronically controlled clutch pedal dashpot driveline torque limiter according to the present invention.

BEST MODE(S) FOR CARRYING OUT THE INVENTION

Figure 1:
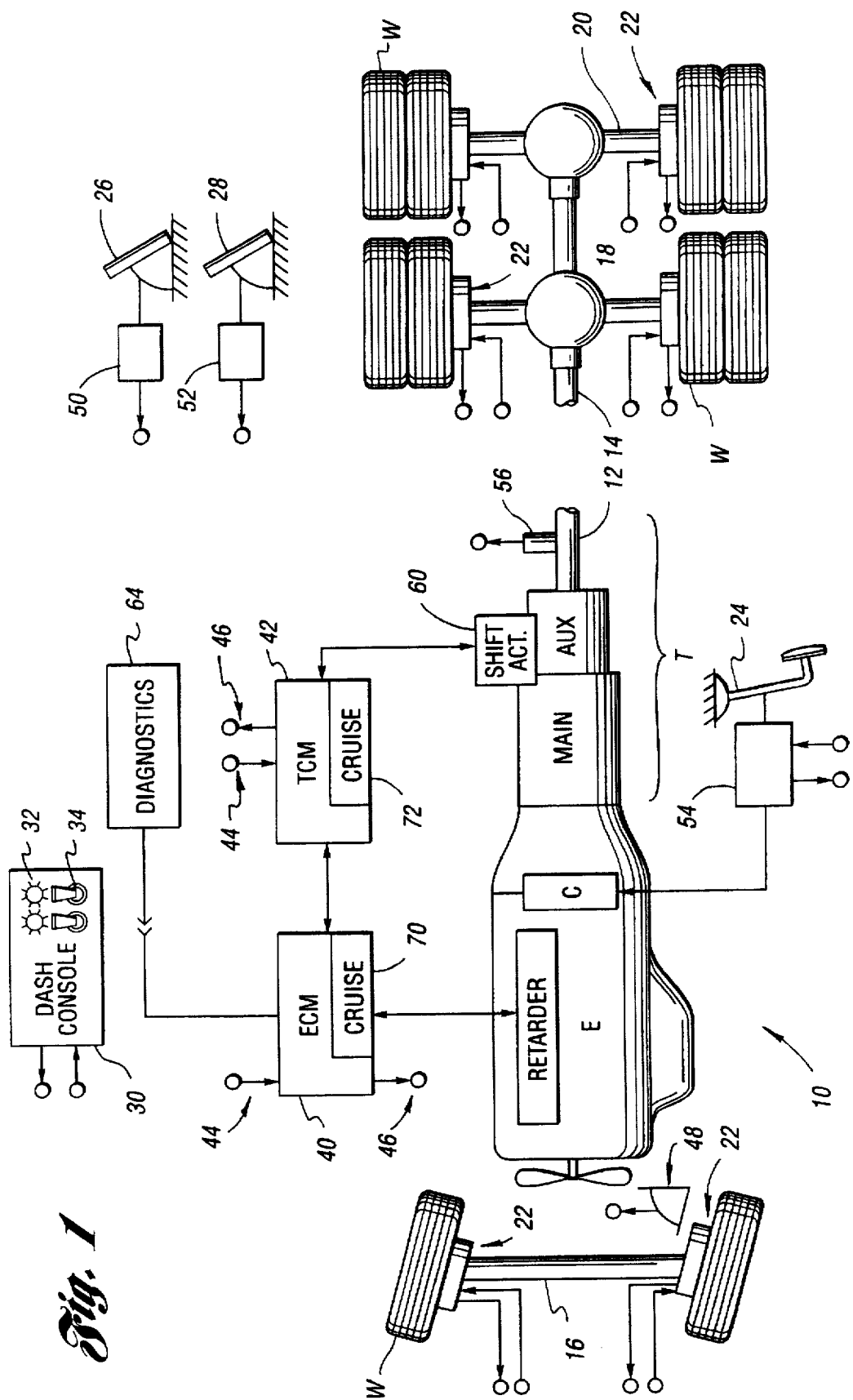
FIG. 1 is a schematic illustration of a typical vehicle application utilizing an electronically controlled clutch pedal dashpot torque limiter according to the present invention.

Referring now to FIG. 1, a graphical representation of a vehicle utilizing an electronically controlled clutch pedal dashpot driveline torque limiter according to the present invention is shown. FIG. 1 depicts a vehicle 10, such as a tractor of a tractor semi-trailer vehicle, having an electronically controlled engine E coupled to a compound transmission T via a clutch mechanism C. Although a vehicle such as depicted in FIG. 1 represents one of the possible applications for the system and method of the present invention, it should be appreciated that the present invention transcends any particular type of vehicle employing an electronic control module to limit the engagement rate of a master clutch.

In a preferred embodiment, transmission T is preferably a compound change gear or change speed transmission having a main section connected in series with an auxiliary section which includes an output shaft 12 coupled to a vehicle drive shaft 14. Vehicle 10 includes at least two axles such as a steer axle 16 and at least one drive axle, such as axles 18 and 20. Each axle supports corresponding wheels W having foundation or service brake components 22 which may be manually or automatically actuated depending upon the particular application and operating conditions. Service brake components 22 may include wheel speed sensors and electronically controlled pressure valves to effect control of the vehicle braking system as is known.

Vehicle 10 also includes various operator controls such as clutch pedal 24, accelerator pedal 26, brake pedal 28, and an operator interface, such as dashboard control console 30, which may include any of a number of output devices 32, such as lights, LED or LCD displays, alarms, buzzers, and the like. Dashboard control console 30 also includes various input devices 34, such as switches, potentiometers, push buttons, and the like. The vehicle control system includes an electronic control module such as engine control module (ECM) 40 and preferably includes an additional electronic control module for effecting control of transmission T, such as transmission control module (TCM) 42. Of course, engine and transmission control may be combined in a single electronic control module for some applications. The ECM 40 and TCM 42 communicate with a variety of sensors via inputs 44 and with numerous actuators via outputs 46. Sensors may include a steering angle sensor 48, wheel speed sensors (included in braking components 22), an electronic accelerator pedal sensor (APS) 50, a brake pedal sensor or switch 52, a clutch control/sensor 54, and an output speed sensor 56, among numerous others. Clutch control/sensor 54 may be manually operated, or may be partially or fully automated. In a preferred embodiment, clutch control/sensor 54 includes a clutch pedal position sensor and a solenoid to limit the clutch engagement rate as illustrated and described in detail with reference to FIGS. 2 and 5.

It should be appreciated that the term "clutch pedal" as used herein is intended to be broadly construed, and the invention is not intended to be restricted merely to a device in a vehicle cab. One of ordinary skill will appreciate that, of course, the clutch pedal dashpot described in detail below could be positioned in numerous vehicle locations other than those specifically illustrated.

Actuators may include a shift actuator 60 for automatically effecting a gear shift within transmission T, electronically controlled pressure valves (included in braking components 22), and an engine retarder 62 or a driveline retarder (not specifically illustrated). As is known, a retarder is a device utilized to supplement the foundation or service brakes when descending long grades and to prolong service brake life in high-frequency start and stop operation. Retarders may be categorized as engine brakes, exhaust brakes, hydraulic retarders and electric retarders. In a preferred embodiment, engine retarder 62 is an engine brake such as the well known Jacobs engine brake. This device converts a power producing diesel engine into a power absorbing air compressor. This is achieved by shutting off the fuel and hydraulically opening the exhaust valve as two or more pistons approach top dead center during the compression stroke.

As also illustrated in FIG. 1, a diagnostics module 64 may be selectively connected to ECM 40 and preferably communicates status messages as defined by the SAE J1587 standard published by the Society of Automotive Engineers, the disclosure of which is hereby incorporated by reference in its entirety. These messages are also available to other system microprocessors during normal operation such as TCM 42 and include information such as current engine speed and torque, accelerator position, road speed, cruise control status, and cruise control set speed, among many others. It will be appreciated by one of ordinary skill in the art that the various connections between electronic controllers, sensors, and actuators may be changed to accommodate the particular requirements of a specific application without departing from the spirit or scope of the present invention.

The ECM 40 and TCM 42 contain control logic rules which may be implemented in a variety of combinations of hardware circuitry components and programmed microprocessors to effect control of the various vehicle systems and subsystems including the clutch pedal dashpot driveline torque limiter of the present invention. Often, control functions are logically separated and have specific input parameters, control equations, and output parameters which may be unique or shared with other logical control functions and/or other system and subsystem controllers.

Referring now to FIG. 2, there is shown a cross-section of an electronically controlled clutch pedal dashpot 54 of the present invention for limiting the rate torque is applied to a driveline of a vehicle, such as a heavy-duty truck as illustrated in FIG. 1. In the preferred embodiment, the clutch pedal dashpot 54 includes a master clutch housing 112 and a dashpot assembly shown generally by reference numeral 114. As shown, the dashpot assembly 114 is fixedly attached to the master clutch housing 112 and a mounting wall 116, such as the firewall of the truck. As shown in the drawings and described in greater detail below, the dashpot assembly 114 is designed to receive a push rod 118, which is pivotally connected to a clutch pedal 24.

With continuing reference to FIG. 2, the dashpot assembly 114 preferably includes a substantially hollow piston housing 130 and a damper piston 132 disposed within the housing. The damper piston 132 slides axially within the piston housing 130 between a rest position and a reset position based on the displacement of the clutch pedal 24 between a first, or resting position at which point the clutch is engaged and a second, or depressed, position at which point the clutch is disengaged. As shown, the damper piston 132 is generally hollow and preferably generally T-shaped so as to create a chamber 142, between the piston and the housing, within which a reset spring 138 is disposed.

As best shown in FIG. 2, the piston housing 130 includes a check valve assembly shown generally by reference numeral 140. In the preferred embodiment, the check valve assembly 140 includes a one-way check valve and passage which allows air to be drawn into the chamber 142 as the clutch pedal 24 is displaced from the resting position to the depressed position (i.e. as the damper piston 130 is axially displaced toward the left). As shown, the check valve assembly 140 also prevents or impedes air from being expelled from the chamber 142 as the clutch pedal 120 returns to the resting position from the depressed position (i.e. as the damper piston 130 is axially displaced toward the right). Preferably, the check valve and passage are sized so as to restrict the flow of air drawn into the chamber 142 to a first rate.

The piston housing 130 also preferably includes passages 144 and 146 in fluid communication with the chamber 142. As shown, the passage 144 extends from the chamber 142 through the housing 130 and is in fluid communication with the atmosphere through an orifice. It should be noted that the passage 144 and the orifice allow air to be both drawn into and expelled from the chamber as the clutch pedal 24 is displaced between the resting position and the depressed position. Most preferably, the passage 144 and orifice are sized so as to restrict the flow of air drawn into and expelled from the chamber to a second rate as the clutch pedal 24 is displaced between positions, the second rate being slower than the first rate at which air is allowed to be drawn into the chamber 142 via the check valve assembly 140. The piston housing 130 and damper piston 132 preferably include O-rings 134 and 136, respectively, which provide a seal between the housing and piston.

As also shown in FIG. 2, clutch pedal 24 includes a clutch pedal position sensor, indicated generally by reference numeral 181. In a preferred embodiment, clutch pedal position sensor 181 includes a potentiometer which has a resistive element 182 and a wiper arm 184. As is known, such an arrangement provides an indication of the relative clutch pedal position to the ECM 70 based on the voltage across wiper arm 184 and one of the terminal ends of resistive element 182.

Clutch pedal dashpot 54 also includes a solenoid assembly 186 for controlling the air flow rate through passage 146 via movement of pin 188. A return spring 187 may be utilized to create a normally open or normally closed arrangement depending upon the particular application. In a normally closed arrangement, pin 188 normally blocks passage 146 so that air must be expelled through passage 144 and the orifice. Power may be applied to the solenoid to increase the rate of engagement of the clutch by retracting pin 188. If the solenoid should fail, a fault is logged in ECM 70 and the vehicle operator is alerted via dash console 30. The clutch apply rate is still limited by passage 144 and the orifice.

In a normally open arrangement, pin 188 is normally retracted and passage 144 is unrestricted. In this arrangement, passage 144 may be eliminated. If the solenoid should fail, a fault is logged in ECM 70 and the vehicle operator is alerted. However, little or no damping is provided since air may flow freely through passage 146. A normally open arrangement provides greater control authority since the engagement rate may be controlled between a maximum rate determine by the size of passage 146, and a nominally zero rate when pin 188 substantially blocks passage 146. Of course, the exhaust passage may be through the solenoid itself if desired.

Referring now to FIG. 3, there is shown a cut-away of the clutch pedal dashpot shown in FIG. 2, illustrating the use of a lip seal 136' in place of the O-ring 136. The lip seal, as is known, folds back and forth between the housing 130' and the damper piston 132', allowing air to be transferred between the chamber 142 and the chamber 148 as the damper piston is translated axially within the housing. It should be appreciated that with the use of the lip seal 136', the check valve and/or the passages could be eliminated. It should also be appreciated that the clutch pedal dashpot could utilize different combinations of the lip seal, the check valve and the passages, so long as the desired result is achieved: that the damper piston be displaced from the rest position to the reset position when the clutch pedal is depressed at a rate which exceeds the rate at which the damper piston returns to the rest position when the clutch pedal is released. This slows the rate of clutch engagement and, therefore, controls the rate torque is applied to the driveline.

Returning now to FIG. 2, axial displacement of the damper piston 132 within the piston housing 130 is restricted by a first piston stop member, or key, 150 so that the position of the damper piston relative to the clutch pedal 24 is fixed. It should be appreciated that as the clutch pedal 24 is depressed, the damper piston 132 is displaced toward the left to the key 150 by the reset spring 138. The speed with which the damper piston 132 moves is governed not only by the spring constant of the spring 138, but also by the rate at which air is drawn into the chamber 142.

With continuing reference to FIG. 2, the master clutch housing 112 includes an extended piston 156 disposed within the master clutch housing 112. As shown, the extended piston 156 preferably receives, and is fixedly connected to, the push rod 118, such that the extended piston moves axially within the clutch pedal dashpot 110 as the clutch pedal 24 is displaced between the resting position and the depressed position. The key 150 is sized to allow the extended piston 156 to pass therethrough while still restricting axial displacement of the damper piston 132 as described above. Thus, the damper piston 132 and the extended piston 156 are coupled to each other for only a portion of the clutch pedal travel. As shown, the extended piston 156 may include an orifice, or vent, 152 which is in fluid communication with the vehicle cab, allowing clean air to be cycled in and out of the housing.

A second piston stop, or key, 158 restricts displacement of the extended piston 156 in one direction and a preload spring 180 restricts axial displacement of the extended piston in the other direction. It should be appreciated that the preload spring 180 is preferably selected so as to provide an appropriate preload force on the extended piston 156 so as to overcome the force exerted on the damper piston 132 by the reset spring 38 and return the clutch pedal 24 to the resting position once the clutch pedal is released by the vehicle operator.

As shown in FIG. 2, a hydraulic fluid reservoir 176 provides hydraulic fluid 174 to the master clutch housing 112 through a pair of fluid make-up ports 170 and 172. O-ring 178 functions as a seal between the hydraulic fluid reservoir 176 and the master clutch housing 112. Additional sealing between the extended piston 156 and the housing 112 is provided by the O-rings 160 and 162.

Referring now to FIG. 4, there is illustrated a hydraulically actuated, self-adjusting clutch mechanism shown generally by reference numeral 190. As is known, the clutch mechanism 190 is positioned between an engine E and a transmission T of a driveline and functions to couple the engine to the transmission. More specifically, the clutch mechanism 190 releasably couples the adjacent ends of an engine crankshaft 194 and a transmission input shaft 196.

As best shown in FIG. 4, the clutch mechanism 190 includes a hydraulic piston 200 which is attached to a clutch release arm 206. The hydraulic piston 200 moves axially within a piston chamber 202 which is in fluid communication with the master clutch housing 212 shown in FIG. 2. The clutch release arm 206 is pivotally connected to a release bearing assembly 208 through a pivot ball 210. As hydraulic fluid from the master clutch housing 112 fills the piston chamber 202, the hydraulic piston 206 is axially displaced. This causes the clutch release arm 206 to slide the release bearing assembly 208 along the transmission input shaft 196. As a result, pivoted release levers 212, which are coupled to the release bearing assembly 208, apply pressure to a pair of spring-loaded pressure plates 214.

Positioned between the spring-loaded pressure plates 214 and a flywheel 216, which is fixedly attached to the engine crankshaft 194 for rotation therewith, is a driven disc 218. The disc 218 is lined on both faces with friction material, shown generally by reference numeral 220. The disc 218 is free to float coaxially between the pressure plates 214 and the flywheel 216, and is carried on a hub 222 splined onto the transmission input shaft 196. As is known, this arrangement has the advantage of, in effect, doubling torque capacity of the clutch and halving the temperature of the rubbing surface during progressive engagement, thereby increasing the life of the friction material 220.

With continuing reference to FIG. 4, since the clutch mechanism 190 is self-adjusting, when the driven disc 218 wears, the pressure plate spring force from the springs 224 forces the pressure plates 214 to move to the left, carrying the release levers 212 and the release bearing assembly 208 to the left. This in turn forces the hydraulic piston 200 deeper into the chamber 202, displacing hydraulic fluid therefrom to the fluid reservoir 176 through the master clutch housing 112. Therefore, clutch pedal 24 position is not significantly altered with clutch friction material wear.

With combined reference to FIGS. 2 and 4, it should be appreciated that as the clutch pedal 24 is depressed, the extended piston 156 is displaced toward the left, compressing the preload spring 180. Depending on how fast the clutch pedal is depressed, the extended piston 156 may separate from the damper piston 132. With the clutch pedal 24 depressed and the extended piston 156 displaced to the left, the reset spring 138 expands and displaces the damper piston 132 to the left. The speed with which the damper piston 132 moves is governed not only by the spring constant of the spring 138, but also by the rate at which air is drawn into the chamber 142.

Hydraulic fluid is forced out of the master clutch housing 112 of FIG. 2 and supplied to the clutch mechanism 190 of FIG. 4. Once the clutch pedal 24 is released by the vehicle operator, the pedal begins to return to the resting position primarily due to the hydraulic fluid pressure created by the clutch pressure plate springs. Preload spring 180 is secondary to the hydraulic pressure on the piston. It is effective, after the make-up port 172 is traversed, to push the piston to the stop 158. The fluid pressure forces the extended piston 156 back toward the right. As this occurs, fluid is pushed into the clutch housing 112 from the clutch mechanism 190. As the pressure plate springs 224 expand, the extended piston 156 travels through the key 148 and contacts the damper piston 132, displacing it to the right, compressing the reset spring 138 and forcing air to be expelled from the chamber 142 through the passage 144 and/or passage 146.

As is known, every portion of clutch pedal travel does not directly affect clutch engagement and disengagement. For example, the first portion of clutch pedal travel does not result in disengagement of the clutch due to internal clearances of clutch mechanism components. In the preferred embodiment, the dashpot 110 is designed such that the clutch begins to engage (i.e. the clutch begins to couple the engine to the driveline) when the extended piston first contacts the damper piston 132. This is commonly referred to as the "touch point" or the "point of incipient engagement." The rate of further clutch engagement, i.e. the rate at which torque is applied to the driveline, is then controlled via the reset spring 138 and the passages 144 and 146 (controlled by solenoid 186), all of which function to slow the rate at which the clutch fully engages by slowing the rate at which the clutch pedal is allowed to return to the resting position. As a result, the time rate of change of torque to the driveline is controlled, regardless of how zealously the driver attempts to engage the clutch.

Referring now to FIG. 5, there is shown a cross-section of an alternative embodiment, shown generally by reference numeral 240, of an electronically controlled clutch pedal dashpot driveline torque limiter according to the present invention. In this embodiment, the dashpot 240 includes a master clutch housing 242 and a dashpot assembly shown generally by reference numeral 244. As shown, the dashpot assembly 244 is fixedly attached to the master clutch housing 242 so as to facilitate cooperation with the clutch pedal 246 as shown. It should be noted that the master clutch housing 242 may be functionally similar to the master clutch housing 112 described above with reference to the embodiment shown in FIG. 2. It should be noted that alternatively, the connection between the clutch pedal and the clutch could be a self-adjusting cable system well known in the art. Regardless of the alternative utilized, the clutch engagement positions are preferably fixed relative to the clutch pedal attachment points.

The dashpot 240 of FIG. 5 preferably includes a bellows 250. The clutch pedal 246 cooperates with the bellows 250 through a pad 252 to expand and contract the bellows 250 as the vehicle operator displaces the clutch pedal between a resting position wherein the clutch is engaged and a depressed position wherein the clutch is disengaged. In the embodiment shown, air flow into and out of the bellows 250 is governed by a check valve 254 and at least one passage 256. In this embodiment, passage 256 exhausts to atmosphere through solenoid 260. As in the previous embodiment, the check valve 254 is a one-way check valve which allows air to be drawn into the bellows 250 as the clutch pedal 246 is displaced from the resting position to the depressed position, and which prevents or impedes air from being expelled from the bellows as the clutch pedal returns to the resting position from the depressed position. Preferably, the check valve 254 is sized so as restrict the flow of air drawn into the bellows 250 to a first rate. Also preferably, clutch pedal 246 includes a clutch pedal position sensor (not specifically illustrated), such as position indicator 181 of FIG. 2.

As also shown in FIG. 5, the passage 256 provides a fluid communication between the bellows 250 and the atmosphere through solenoid 260. By controlling the position of pin 258 via the current supplied to solenoid 260 from ECM 70 via output 46, the air flow rate through passage 256 is regulated. It should be noted that the passage 256 may allow air to be both drawn into and expelled from the bellows 250 depending upon the position of pin 258 as the clutch pedal 246 is displaced between the resting position and the depressed position.

As described above, every portion of clutch pedal travel does not directly affect clutch engagement and disengagement. In this embodiment, therefore, the dashpot is designed such that the clutch begins to engage (i.e. the clutch begins to couple the engine to the driveline) when the clutch pedal 246 begins to engage the bellows 250. The rate of further clutch engagement, i.e. the rate at which torque is applied to the driveline, is then controlled via the passage 256 by solenoid 260 which functions to slow the rate at which the clutch fully engages by slowing the rate at which air is expelled from the bellows, thereby slowing the rate at which the clutch pedal is allowed to return to the resting position. As a result, the rate of torque application to the driveline is controlled regardless of how zealously the driver attempts to engage the clutch. It should be appreciated that the embodiment shown illustrates just one way to achieve the desired result: to slow the rate of clutch engagement and, therefore, control the rate torque is applied to the driveline.

Figures 6, 7:
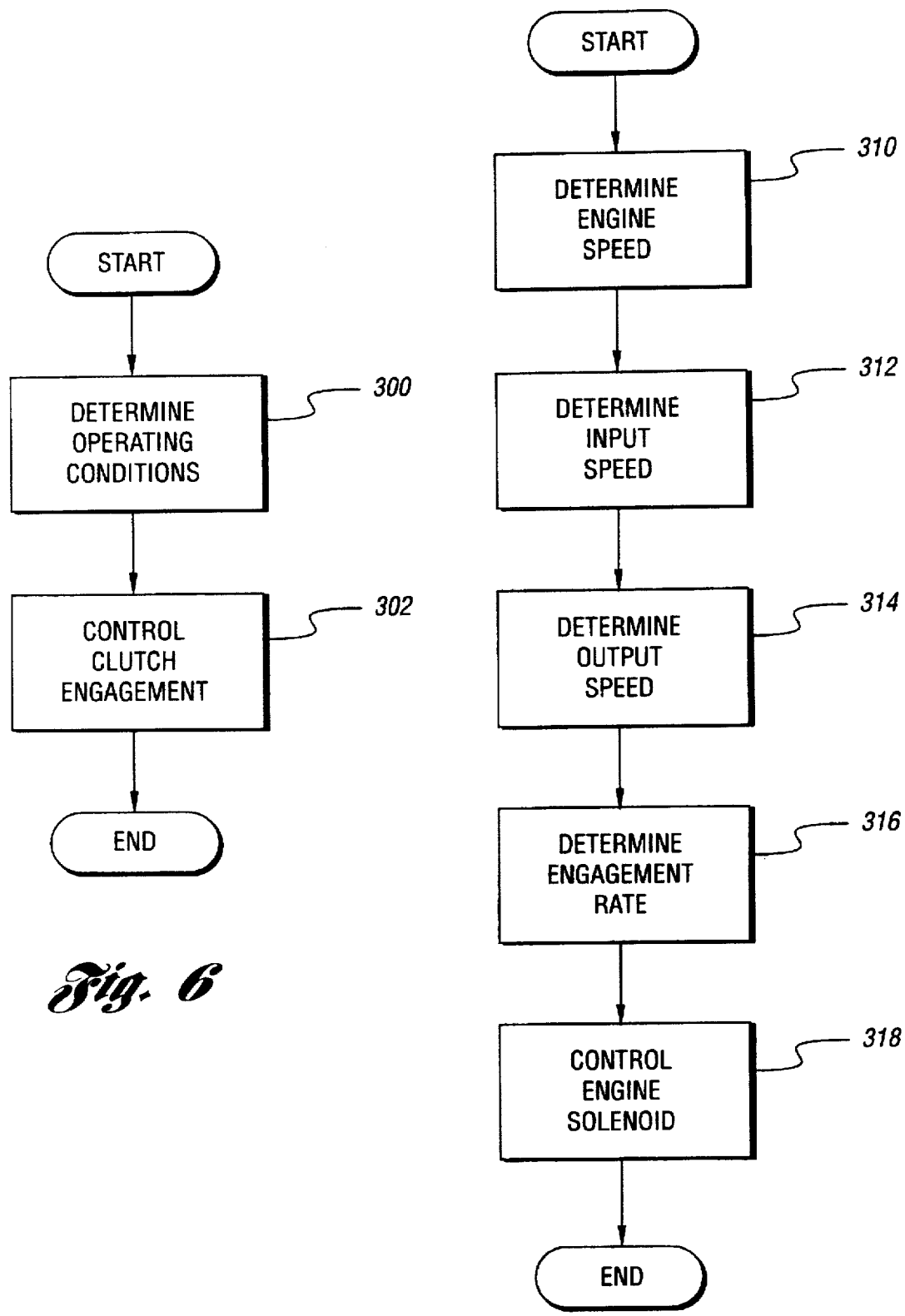
FIGS. 6 and 7 are flow charts illustrating a system and method for controlling a clutch pedal dashpot driveline torque limiter according to the present invention.

Referring now to FIGS. 6 and 7, flow charts are shown to illustrate the control logic of a system and method for controlling the engagement rate of a master clutch according to the present invention. The control logic is preferably executed by a programmed microprocessor within ECM 70 or TCM 72, but may be performed by a dedicated clutch electronic control unit utilizing various combinations of electric and electronic circuitry and/or programmed microprocessor(s). Block 300 represents determination of the current operating conditions of the vehicle to facilitate a context-sensitive control strategy. Block 302 then controls or limits the master clutch engagement based on the current operating conditions.

FIG. 7 provides a more detailed description of the various operating parameters used to control the master clutch engagement to prevent excessive slipping of the clutch and reduce or eliminate the incidence of engine stall due to an improper engagement rate for the current engine speed. Block 310 determines the current engine speed which may be obtained from an appropriate sensor and broadcast by ECM 70 to various other system and subsystem controllers. Block 312 determines the transmission input speed while block 314 determines the transmission output speed as indicated by output shaft sensor 56 of FIG. 1. Block 316 determines the clutch pedal engagement rate by monitoring the clutch pedal position sensor. This is the rate requested by the operator by releasing the clutch pedal and may be equal to or different from the actual master clutch engagement rate as determined by the electronically controlled clutch pedal dashpot of the present invention.

Block 318 of FIG. 7 may control or limit the master clutch engagement rate by controlling an associated solenoid, or control the engine to avoid engine stall based on the current operating conditions as determined by steps 310 through 316. Of course, the current vehicle operating condition may be indicated by various other sensors without departing from the spirit or scope of the present invention. Control of the vehicle engine may include requesting an increase or decrease in engine speed prior to allowing engagement of the master clutch by opening or closing an appropriate passage with a solenoid as disclosed above.

It is understood, of course, that while the forms of the invention herein shown and described constitute the preferred embodiments of the invention, they are not intended to illustrate all possible forms thereof. It will also be understood that the words used are words of description rather than limitation, and that various changes may be made without departing from the spirit and scope of the invention as recited by the following claims.

What is claimed is:

1. In a vehicle having an electronic control unit in communication with at least one sensor for determining current operating conditions, the vehicle also including a clutch pedal and a clutch mechanism for coupling an engine to a driveline, the clutch pedal being displaced between a first position and a second position, a clutch pedal dashpot for controlling the rate torque is applied to the driveline during coupling, the clutch pedal dashpot comprising:

a damper having at least one passage connecting an interior portion to atmosphere to control position of the clutch pedal during coupling, the damper including a housing, a piston sealingly cooperating with the housing to create the interior portion, and a stop member limiting travel of the piston to only a portion of possible travel during displacement of the clutch pedal between the first and second positions; and a solenoid having a member at least partially disposed within the at least one passage to restrict flow of air therethrough, the member being positionable relative to the at least one passage between an open position and a closed position to provide different air flow rates through the at least one passage, the solenoid being in electrical communication with the electronic control unit, wherein the solenoid is controlled by the electronic control unit based on current operating conditions so as to selectively position the member to regulate air flow through the at least one passage and cause controlled application of torque to the driveline during coupling.

2. A system for controlling coupling of an engine to a driveline via a clutch mechanism to control the rate torque is applied to the driveline based on vehicle operating conditions, the system comprising:

a clutch pedal operatively associated with the clutch mechanism for initiating coupling of the engine to the driveline;

a sensor operatively associated with the clutch pedal for providing a clutch pedal position signal;

a damper connected to the clutch pedal having at least one passage connecting an interior portion of the damper to atmosphere;

a solenoid having a member at least partially disposed within the at least one passage to restrict flow of air therethrough; and a control unit in communication with the sensor and the solenoid, the control unit determining engine speed and providing a signal to the solenoid based on the engine speed and the clutch pedal position signal to selectively position the member to control air flow through the at least one passage and effect controlled application of torque to the driveline during coupling.

3. The system of claim 2 wherein the control unit generates a signal to increase the engine speed based on the clutch pedal position signal to avoid engine stall.

4. The system of claim 3 wherein the control unit determines requested rate of clutch engagement based on change of the clutch pedal position signal and provides a signal for the solenoid based on the requested rate.

5. The system of claim 2 wherein the at least one passage extends through the solenoid.

6. A method for controlling coupling of an engine to a driveline via a clutch mechanism operatively associated with a clutch pedal for initiating coupling of the engine to the driveline to control the rate torque is applied to the driveline based on vehicle operating conditions, the method comprising:

determining current operating conditions;

sensing position of the clutch pedal;

determining requested rate of clutch engagement based on the step of sensing; and generating a signal to control a solenoid having a member for regulating air flow through a damper connected to the clutch pedal based on the current operating conditions and the requested rate of clutch engagement so as to control the rate torque is applied to the driveline during coupling.

7. The method of claim 6 wherein the step of determining current operating conditions includes determining engine speed, the method further comprising:

generating a signal to increase the engine speed based on the clutch pedal position signal to avoid engine stall.

* * * * *

UNITED STATES PATENT AND TRADEMARK OFFICE
CERTIFICATE OF CORRECTION

PATENT NO. : 5,718,316
DATED : February 17, 1998
INVENTOR(S) : Thomas A. Gee

It is certified that error appears in the above-identified patent and that said Letters Patent is hereby corrected as shown below:

Column 12, line 11, Claim 4, replace "3" with --2--.

Signed and Sealed this

Twenty-ninth Day of September, 1998

Attest:

BRUCE LEHMAN

Attesting Officer          Commissioner of Patents and Trademarks